United States Patent
Banzon et al.

(10) Patent No.: US 7,752,612 B2
(45) Date of Patent: Jul. 6, 2010

(54) METHOD, APPARATUS AND PROGRAM STORAGE DEVICE FOR DETERMINING AN OPTIMAL NUMBER OF TASKS DURING REORGANIZATION OF A DATABASE SYSTEM WITH MEMORY AND PROCESSOR CONSTRAINTS

(75) Inventors: Arnold T. Banzon, Daly City, CA (US); Craig A. Friske, Morgan Hill, CA (US); John M. Garth, Gilroy, CA (US); Ka C. Ng, San Francisco, CA (US); James A. Ruddy, San Jose, CA (US); Bituin B. Vizconde, Daly City, CA (US)

(73) Assignee: International Business Machines Corporation, Armonk, NY (US)

( * ) Notice: Subject to any disclaimer, the term of this patent is extended or adjusted under 35 U.S.C. 154(b) by 1558 days.

(21) Appl. No.: 11/047,955

(22) Filed: Jan. 31, 2005

(65) Prior Publication Data

US 2006/0173938 A1   Aug. 3, 2006

(51) Int. Cl.
*G06F 9/45* (2006.01)
*G06F 9/46* (2006.01)
*G06F 12/00* (2006.01)

(52) U.S. Cl. .................... 717/151; 718/105; 707/825
(58) Field of Classification Search .................. None
See application file for complete search history.

(56) References Cited

U.S. PATENT DOCUMENTS

| | | | | |
|---|---|---|---|---|
| 5,202,987 A | * | 4/1993 | Bayer et al. ............ | 718/102 |
| 5,222,235 A | * | 6/1993 | Hintz et al. ............ | 707/101 |
| 5,307,485 A | * | 4/1994 | Bordonaro et al. ..... | 707/7 |
| 5,596,747 A | | 1/1997 | Katabami et al. | |
| 5,761,667 A | | 6/1998 | Koeppen | |
| 5,797,000 A | * | 8/1998 | Bhattacharya et al. ... | 707/2 |
| 5,940,832 A | | 8/1999 | Hamada et al. | |
| 6,026,394 A | * | 2/2000 | Tsuchida et al. ....... | 707/3 |
| 6,460,048 B1 | | 10/2002 | Teng et al. | |
| 6,519,613 B1 | | 2/2003 | Friske et al. | |
| 7,058,952 B1 | * | 6/2006 | Garth et al. ............ | 718/105 |
| 2002/0143763 A1 | | 10/2002 | Martin, Jr. et al. | |
| 2004/0236743 A1 | | 11/2004 | Blaicher et al. | |

OTHER PUBLICATIONS

U.S. Appl. No. 09/501,493, filed Feb. 9, 2000, Garth et al.

* cited by examiner

*Primary Examiner*—Tuan Q Dam
*Assistant Examiner*—Evral Bodden
(74) *Attorney, Agent, or Firm*—Gates & Cooper LLP

(57) ABSTRACT

A method, apparatus and program storage device for determining an optimal number of tasks during reorganization of a database system with memory and processor constraints. The reorganization system identifies memory constraints, identifies processing capabilities and determines a number of reorganization processes and a combination of reorganization processes that provides a minimum reorganization time based upon the identified memory and processing constraints. The identified memory and processing capabilities identify a domain representing a set of rules applicable to the identified memory and processing capabilities. The set of rules of the identified domain are applied to determine an optimal number and combination of reorganization processes that minimizes a reorganization time.

26 Claims, 8 Drawing Sheets

METHOD, APPARATUS AND PROGRAM STORAGE DEVICE FOR DETERMINING AN OPTIMAL NUMBER OF TASKS DURING REORGANIZATION OF A DATABASE SYSTEM WITH MEMORY AND PROCESSOR CONSTRAINTS

BACKGROUND OF THE INVENTION

1. Field of the Invention

This invention relates in general to computer-implemented database systems, and more particularly to a method, apparatus and program storage device for determining an optimal number of tasks during reorganization of a database system with memory and processor constraints.

2. Description of Related Art

Databases are computerized information storage and retrieval systems. A Relational Database Management System (RDBMS) is a database management system (DBMS) which uses relational techniques for storing and retrieving data. Relational databases are organized into tables that consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

A table can be divided into partitions, with each partition containing a portion of the table's data. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate channel path. Partitioning also promotes high data availability, enabling application and utility activities to progress in parallel on different partitions of data.

Indexing is a technique used by most current database management systems to speed up particular kinds of queries (usually by internally generating and storing redundant information to more quickly locate table entries). An index is an ordered set of references to the records or rows in a database file or table. The index is used to access each record in the file using a key (i.e., one of the fields of the record or attributes of the row).

Over time and with frequent use, databases often become disorganized. Constant additions, deletions and updates cause data to become disorganized. When that happens, retrieving data involves extensive CPU, I/O and elapsed-time, costing time, money and end-user productivity. In turn, customers are lost and revenue decreases. To reduce these costs, data must be reorganized.

Accordingly, numerous attempts have been made to reorganize such databases. Reorganization of a database includes changing some aspect of the logical and/or physical arrangement of the database. Most database management systems (DBMS's) today provide some type of reorganizer utility that provides online reorganization capability.

Reorganizing a database can require significant time and usually involves taking the database offline. Typically, the database may be unloaded to tape or DASD and then reloaded to restore data clustering. Secondary indices for the reorganized database must be reorganized or rebuilt. Usually, a backup image copy of the reorganized database is made. But, because many applications require 24×7 availability of databases, there has been increasing demand to minimize any outages caused by utilities such as reorganizers. An online reorganizer minimizes outages by performing most of its processing while other applications still have access to the database.

In an attempt to speed up the loading of data, various approaches have been tried involving the use of parallel processing. Parallel processing exploits the multiprocessor capabilities of modem high-speed computers and refers to the use of several processors. Parallel execution in reference to database operations applies to the many functions performed on a database, including joins, sorts, load balancing, reorganization, data load, index creation, indexed access, backup, and restore functions. Some or all of such functions may be performed on all database partitions simultaneously. For example, a query may be broken into a number of pieces that can be executed in parallel through intelligent database partitioning. When a database is partitioned, the data may be distributed across database partitions, or subsets of the database, which can reside on multiple servers or within a large SMP server. A partition map facilitates the management of the distribution and redistribution of the data as required.

Nevertheless, such parallelism adds a level of complexity to a database system. For example, loading techniques that rely upon parallel execution of subtasks may need to be optimized to decrease processing times. One such system is disclosed in co-pending patent application by Garth et al. having Ser. No. 09/501493, filed Feb. 9, 2000 and entitled "TECHNIQUE FOR DETERMINING AN OPTIMAL NUMBER OF TASKS IN A PARALLEL DATABASE LOADING SYSTEM WITH MEMORY CONSTRAINTS", which patent application is assigned to the same assignee as here in, and is hereby incorporated by reference in its entirety. In the Garth et al. application, the optimum number of tasks to be processed by the system for load and sort processes is determined by identifying the memory constraints of the system, identifying available processing capabilities, and determining a number of load and sort processes to be started in parallel based on the identified memory constraints and processing capabilities. However, in contrast to a database system being reorganized, the Garth et al. application does not take into consideration the number of data and index unload subtasks in its taskset calculation.

In addition, during reorganization unload, reload, sort, and build processes may all be active at the same time, so the amount of taskset calculation is further constrained by the internal distribution of processes in addition to the memory and processor constraint.

It can be seen that there is a need for a method, apparatus and program storage device for determining an optimal number of tasks during reorganization of a database system with memory and processor constraints.

SUMMARY OF THE INVENTION

To overcome the limitations in the prior art described above, and to overcome other limitations that will become apparent upon reading and understanding the present specification, the present invention discloses a method, apparatus and program storage device for determining an optimal number of tasks during reorganization of a database system with memory and processor constraints.

The present invention solves the above-described problems by providing a reorganization system that identifies memory constraints, identifies processing capabilities and determines a number of reorganization processes and a combination of reorganization processes that provides a minimum reorganization time based upon the identified memory and processing constraints. The identified memory and processing capabilities identify a domain representing a set of rules applicable to the identified memory and processing capabilities. The set of rules of the identified domain are applied to determine an optimal number and combination of reorganization processes that minimizes a reorganization time.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for determining an optimal number of tasks during reorganization of a database system with memory and processor constraints.

Figure 1:
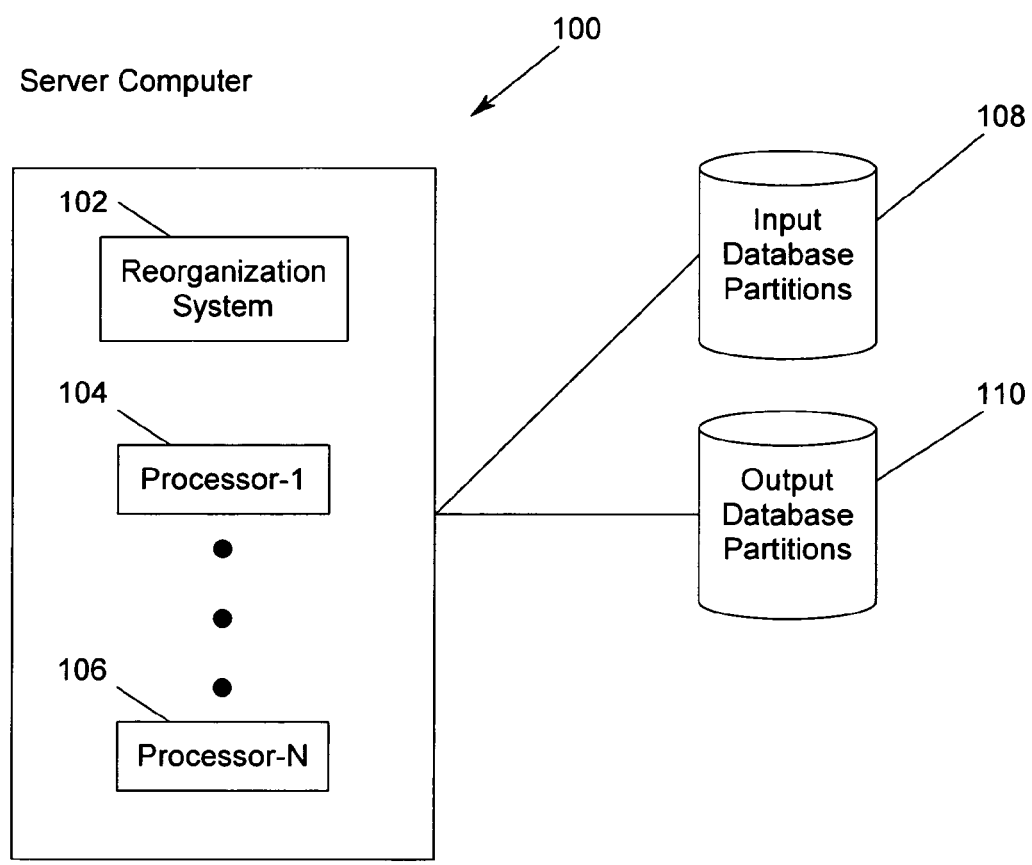
FIG. 1 is a diagram illustrating a computer hardware system that could be employed in accordance with the present invention.

FIG. 1 is a diagram illustrating a computer hardware environment that could be used in accordance with the present invention. A computer server 100 comprises a reorganization system 102 and multiple processors (Processor-1 104 and Processor-N 106). The computer server 100 is coupled to data stores, including data store 108, which stores input database partitions and data store 110, which stores output database partitions. The direction of the reorganization system 102 reads rows from the input 108 and writes reorganized rows to the output 110. Although data stores 108, 110 are illustrated at different data stores, it is to be understood that in some implementations data stores 108, 110 may be same files.

Figure 2:
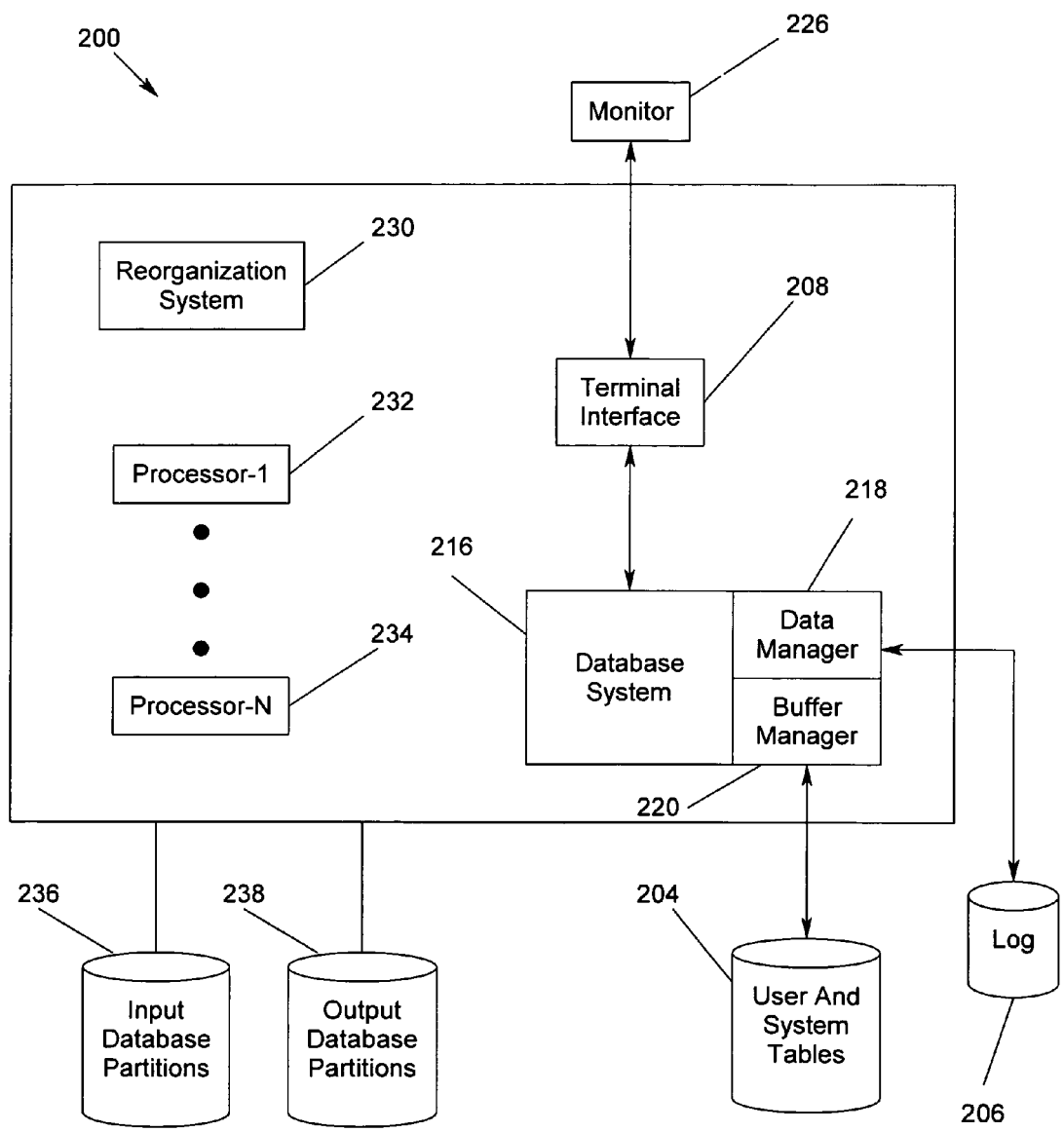
FIG. 2 is a diagram illustrating a computer hardware environment that adds further detail to the hardware environment of FIG. 1.

FIG. 2 is a diagram illustrating a computer hardware environment that adds further detail to the hardware environment of FIG. 1. In the environment, a computer system 200 is comprised of one or more processors 232, 234 coupled to one or more data storage devices 204 and 206 that store one or more relational databases in tablespaces. The data storage devices 204 and 206 may comprise a fixed or hard disk drive, a floppy disk drive, a CDROM drive, a tape drive, or other device.

Operators of the computer system 200 use a standard operator interface 208, such as IMS/DB/DC®, CICS®, TSO®, OS/390®, ODBC® or other similar interface, to transmit electrical signals to and from the computer system 200 that represent commands for performing various search and retrieval functions, termed queries, against the databases. In the present invention, these queries conform to the Structured Query Language (SQL) standard, and invoke functions performed by DataBase Management System (DBMS) software. The processors 232, 234 execute database system 216.

The SQL interface has evolved into a standard language for DBMS software and has been adopted as such by both the American National Standards Institute (ANSI) and the International Standards Organization (ISO). The SQL interface allows users to formulate operations on the tables either interactively, in batch files, or embedded in host languages, such as C and COBOL. SQL allows the user to manipulate the data.

The database system 216 and data manager 218 work to provide concurrency control to isolate users and to maintain data integrity. The data manager 218 controls the overall execution environment, including managing log data sets 206, gathering statistics, handling startup and shutdown, and providing management support.

The computer system 200 also includes a reorganization system 230. The processors 232, 234 also control reorganizer system 230 that reorganizes the tables and associated indices stored on the data storage devices 204. This reorganization comprises a logical and/or physical arrangement of tables and associated indices. The computer server 200 is coupled to data stores, including data store 236, which stores input database partitions and data store 238, which stores output database partitions. The direction of the reorganization system 230 reads rows from the input 236 and writes reorganized rows to the output 238. An operator sitting at a monitor 226 may control the computer system 200 via operator interface 208.

Generally, the software, the reorganization system 230 and the instructions derived therefrom, are all tangibly embodied in a computer-readable medium, e.g. one or more of the data storage devices 204 and 206. Moreover, the database system 216, the reorganization system 230, and the instructions derived therefrom, are all comprised of instructions which, when read and executed by the computer system 200, causes the computer system 200 to perform the steps necessary to implement and/or use the present invention. Under control of an operating system, the DBMS software, the reorganization system 230, and the instructions derived therefrom, may be loaded from the data storage devices 204 and 206 through buffer manager 220 into a memory of the computer system 200 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 2 is not intended to limit the present invention. Indeed, those skilled in the art will recognize that other alternative hardware environments may be used without departing from the scope of the present invention.

Figure 3:
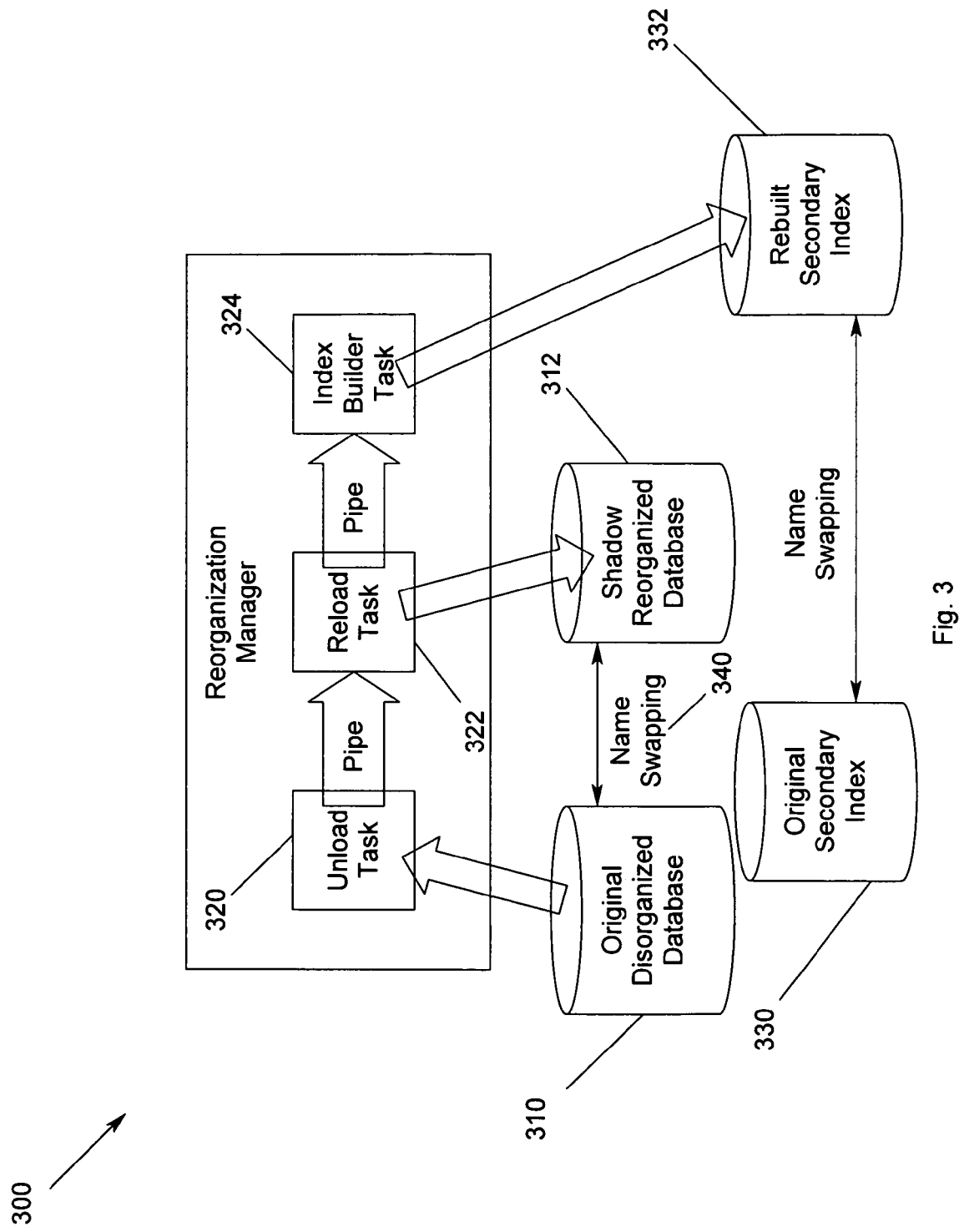
FIG. 3 illustrates a reorganization system for determining an optimal number of tasks during reorganization of a database system with memory and processor constraints according to an embodiment of the present invention.

FIG. 3 illustrates a reorganization system 300 for determining an optimal number of tasks during reorganization of a database system with memory and processor constraints according to an embodiment of the present invention. In FIG. 3, different data sets are used for the input database 310 and the output reorganized database 312. The output reorganized database 312 is called the shadow database. The original database 310 provides records to the unload task 320. Unloaded records are passed from the unload task 320 to the reload task 322 directly. Original secondary indices 330 are provided to an index builder task 324. The index builder task 324 constructs the rebuilt secondary indices 332 for the reorganized database 312 while the original database 310 is being reorganized. Parallel reorganization enables unload, reload, index builder, and image copy tasks to run concurrently. Because the original database 310 exists throughout the reorganization process, applications are allowed to have read access to the original database 310 during most of the reorganization process. The reorganization manager 300 enables read access to the original database 310 during the unload, reload, and index building processes and restricts the access to the original database 310 only during the post-reorganization processing. The shadow data sets in the shadow database 312 are renamed 340 with the original data set names after a successful reorganization. During reorganization, unload, reload, sort, and build processes may all be active at the same time. Thus, the amount of taskset calculation is constrained by the internal distribution of processes in addition to the memory and processor constraint.

Figure 4:
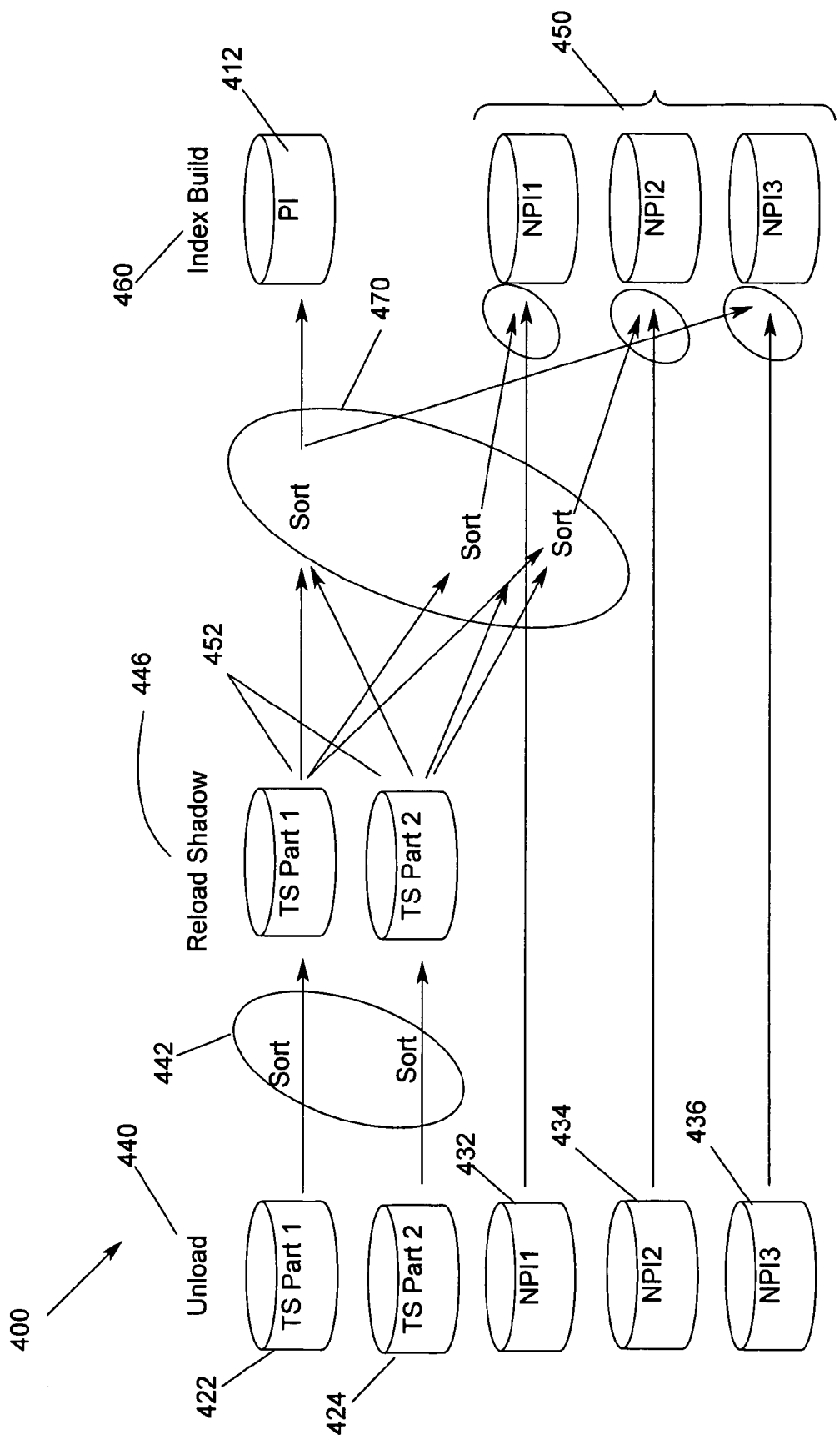
FIG. 4 illustrates a flow diagram showing a reorganization of a database according to an embodiment of the present invention.

FIG. 4 illustrates a flow diagram showing a reorganization of a database according to an embodiment of the present invention. In FIG. 4, the database is divided into multiple partitions, with multiple non-partitioning indices (NPI) 410 and partitioned indices (PI) 412. Two data partitions 422, 424, three NPIs 432, 434, 435 and one PI 412 are shown, but the number of partitions and indices can vary and indices might not even exist. The data being reorganized 422, 424 is unloaded 440, sorted 442, and reloaded 446 back to the original 450 or shadow dataset 452 in parallel. The logical partitions of the NPIs that are not being reorganized 432, 434, 436 are unloaded and its keys piped to the index build tasks 460 to build the NPIs. The index keys for the partitions being reorganized are piped through manifolds to sort tasks 470, followed by the sort tasks piping the sorted keys to the index build tasks 460. Given this relationship, maximizing the number of processes with an optimal ratio of process types during reorganization of a database will result in shorter elapsed times for the overall data base reorganization.

In describing the technique for reorganizing a database by a reorganization system according to an embodiment of the present invention, the reorganization will be assumed to be running on a single server that has multiple processors (symmetric) available sharing a single memory. However, those skilled in the art will recognize that embodiments of the present invention are not meant to be limited to this type of environment, but rather other environments are possible without diverging from the scope of the present invention.

For a reorganization of a database where there are no NPIs or when reorganization for the entire tablespace is being performed, there is not a need for any index unload processes for the logical parts of NPIs that are not being reorganized. In this scenario, the sort processes are blocking the build processes, and the build processes thus cannot start processing keys until all of the keys have been sorted.

If the number of sort processes is constrained so that there are fewer than the number of indices, one or more of the sort processes will have to sort keys belonging to more than one index. The reorganization process will emit the sorted keys sorted first by the index, so if it is piping keys to multiple build processes, then only one of the build processes can be active at a time, and any advantage of starting additional build processes is lost. Consequently, the number of sort processes should equal the number of build processes.

Second, when a NPI exists and reorganization is being performed on the partition level, the number of NPI unload processes must be less than or equal to the number of build processes. If more NPI unload processes than the number of build processes are required, all of the build subtasks would be busy building NPIs while one or more NPI unload processes remain inactive until a build process frees up. So any advantage of starting additional NPI unload processes is lost.

Accordingly, six constraints govern the number of processes that can be initiated. The six constraints are as follows:

1. The number of sort processes cannot exceed the number of indices to be built.
2. The number of build processes is equal to the number of sort processes.
3. The number of NPI unload processes cannot exceed the number of NPIs to be built or the number of build processes.
4. The number of data unload/reload processes cannot exceed the number of partitions to be reorganized.
5. The sum of all number of all processes cannot exceed the capacity of the server's processors.
6. The memory used by all processes cannot exceed the amount available.

Variables for describing the reorganization process are defined as follows:

$N_{UR}$ is the number of data unload/reload processes
$N_U$ is the number of NPI unload processes
$N_S$ is the number of index sort processes
$N_B$ is the number of index build processes
$N_P$ is the number of partitions being reorganized
$N_I$ is the number of indices
$N_{NPI}$ is the number of NPIs Using the variables above, the first four constraints can be expressed by the following equations:

$$N_S <= N_I \qquad 1.$$

$$N_B = N_S \qquad 2.$$

$$N_U = \min\{N_{NPI}, N_B\} \qquad 3.$$

$$N_{UR} <= N_P \qquad 4.$$

The fifth constraint is expressed by the following equation:

$$N_{UR} + N_S + N_B + N_U <= mP, \qquad 5.$$

where P is the number of processors available on the server, and m is a multiplier that is a function of the speed of the processors. Both data unloading/reloading and index sorting are processor intensive operations. However, sufficiently fast processors can handle more than one process at a time.

The sixth and final constraint can be expressed by the following equation:

$$aN_{UR} + bN_S + cN_B + dN_U + e <= M, \quad 6.$$

where M is the amount of memory available, a is the amount of memory required for each data unload/reload process, b is the amount of memory required for each index sort process, c is the amount of memory required for each index build process, d is the amount of memory required for each NPI unload process, and e is the amount of memory required for the main process that directs the unload, reload, sort, and build processes.

To solve this system of linear equations, constraint (2) and (3) may be used to simplify constraints (5) and (6) into equations with two variables:

$$N_{UR} + 3N_S <= mP \quad 5.1$$

$$aN_{UR} + (b+c+d)N_S + e <= M \quad 6.1$$

Next, when the amount of memory used by each index sort process is significantly greater than the amount of memory used by each index build process plus each NPI unload process, one more final simplification may be made by assuming (b+c+d) is approximately equal to b, thereby resulting in equation 6.2 below.

$$aN_{UR} + bN_S + e <= M \quad 6.2$$

However, the technique for reorganizing a database by a reorganization system according to an embodiment of the present invention provides a solution for the system of equations using constraint (5.1) and (6.1) that avoids the trouble of defining the mathematical difference described above, which would be considered to be significantly greater in actual practice.

Figure 5:
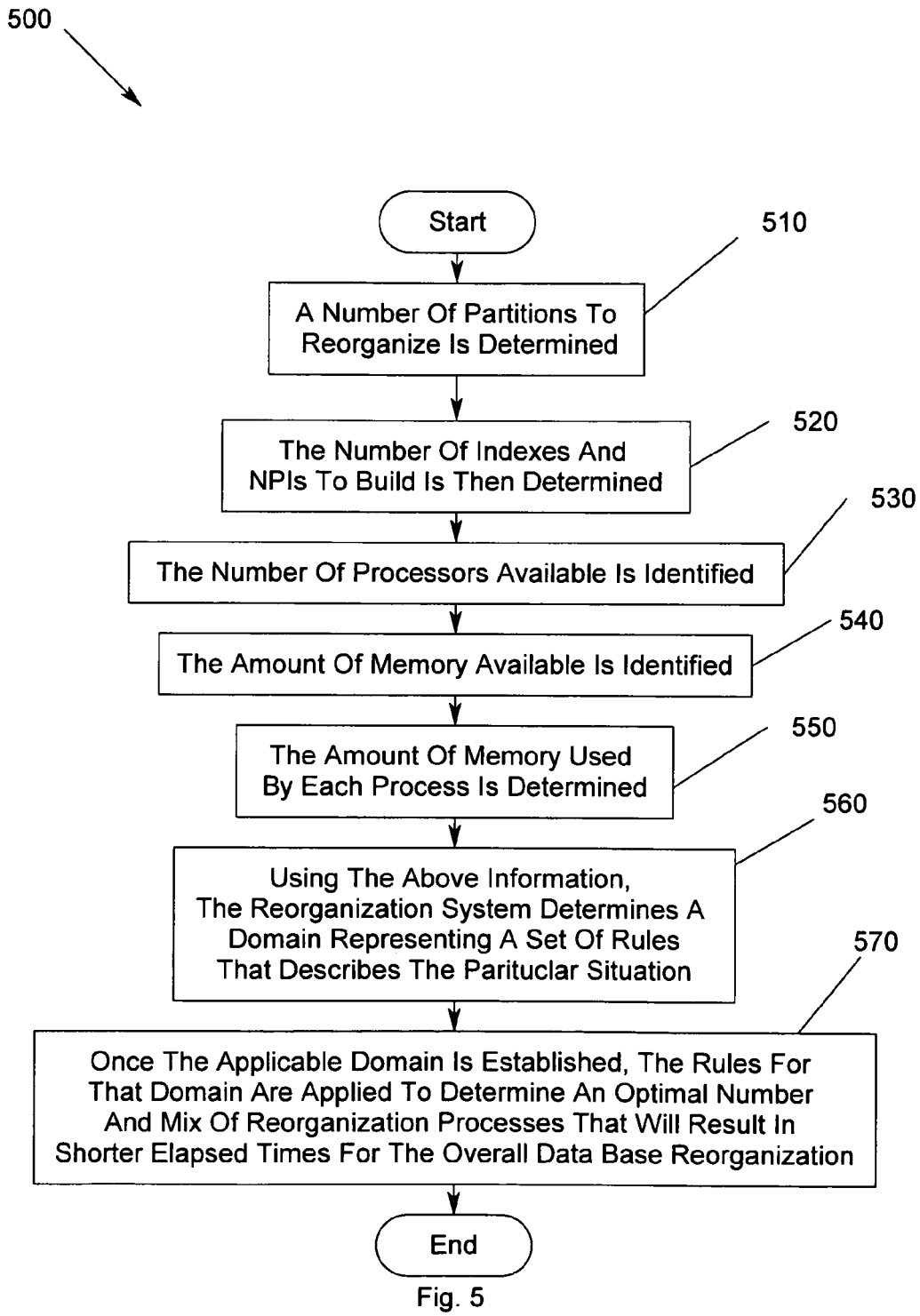
FIG. 5 is a flow chart of the method for providing the optimal number and mix of processes according to an embodiment of the present invention that follows from the domain 3 described above.

FIG. 5 is a flow chart 500 of the method for providing the optimal number and mix of processes according to an embodiment of the present invention that follows from the domain 3 described above. First, the number of partitions to reorganize is determined 510. The number of indices and NPIs to build is then determined 520. The number of processors available is identified 530 and the amount of memory available is identified 540. The amount of memory used by each process is determined 550. Then, using the above information, the reorganization system determines a domain representing a set of rules that describes the particular situation 560. Once the applicable domain is established, the rules for that domain are applied to determine an optimal number and mix of reorganization processes that will result in shorter elapsed times for the overall data base reorganization 570.

Figure 6:
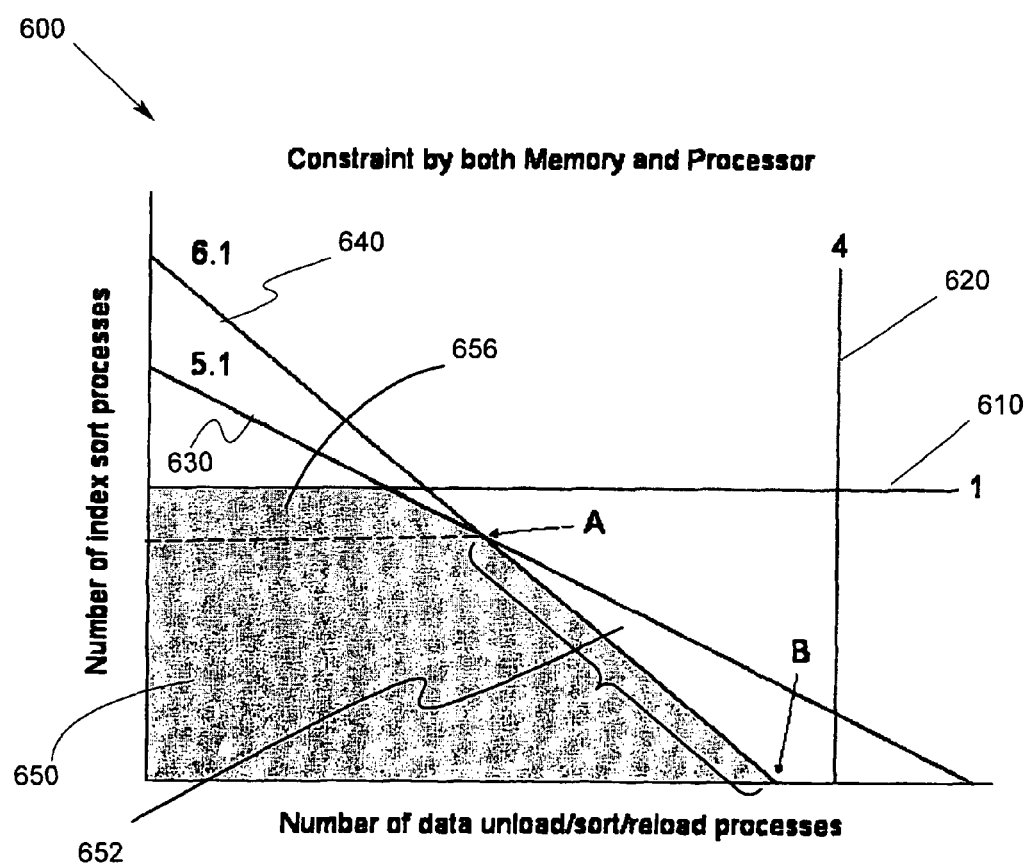
FIG. 6 is a graph that shows an example of the constraints revolving around the number of sort processes and the number of unload/sort/reload processes.

FIG. 6 is a graph that shows an example of the constraints revolving around the number of sort processes and the number of unload/sort/reload processes. After determining the number of processes for both sort and unload/sort/reload, constraint (2) and (3) may be used to determine the number of processes for NPI unload and index build. In FIG. 6, the line labeled 1 610 represents the first constraint, i.e., the number of indices. The line labeled 4 620 represents the fourth constraint, i.e., the number of partitions being reorganized. The line labeled 5.1 630 represents the fifth constraint, i.e., the limitation from the number of processors. Finally, the line labeled 6.1 640 represents the sixth constraint, i.e., the limitation from the amount of available memory.

In FIG. 6, the slope of the processor 630 and memory 640 constraint lines are shown, e.g., slope (processor-constraint)=−⅓ and slope (memory-constraint)=−a/(b+c+d)≈−1, respectively. In other words, the amount of memory required for an unload/sort/reload process is about roughly the same as that of the combined index sort, build and NPI unload processes (a≈b+c+d).

In FIG. 6, the number of partitions being reorganized 620 is large enough so that it does not limit the number of data unload/sort/reload processes. The number of indices 610 is smaller than the maximum number of sort processes that could be started, so it does act as a constraint. The shaded area 650 represents the possible combinations of sort processes and data unload/sort/reload processes that are allowed by the constraints. The point of intersection of the processor 630 and memory 640 constraint lines, A, represents the maximum number of sort processes that can be started while still obeying the maximum total number of memory constraint. The points on the line 652 between point A and point B represent other combinations of numbers of sort and data unload/sort/reload processes that still maximize the total number of processes, but have fewer sort and more unload/sort/reload processes. Points 656 in the shaded area to the left of and above point A represent combinations of numbers of sort and data unload/sort/reload processes where the number of sort processes is larger than at A, but the total number of processes cannot be maximized.

Given these additional constraints and the need to maximize the total number of processes, the optimal point in the above example is point A. The number of sort and unload/sort/reload processes at point A can be calculated by solving the two simultaneous equations given as constraint (5.1) and (6.1):

Domain 1

$$N_S = \frac{(M - e - amp)}{b + c + d - 3a}$$

$$N_{UR} = mP - 3N_S$$

Figure 7:
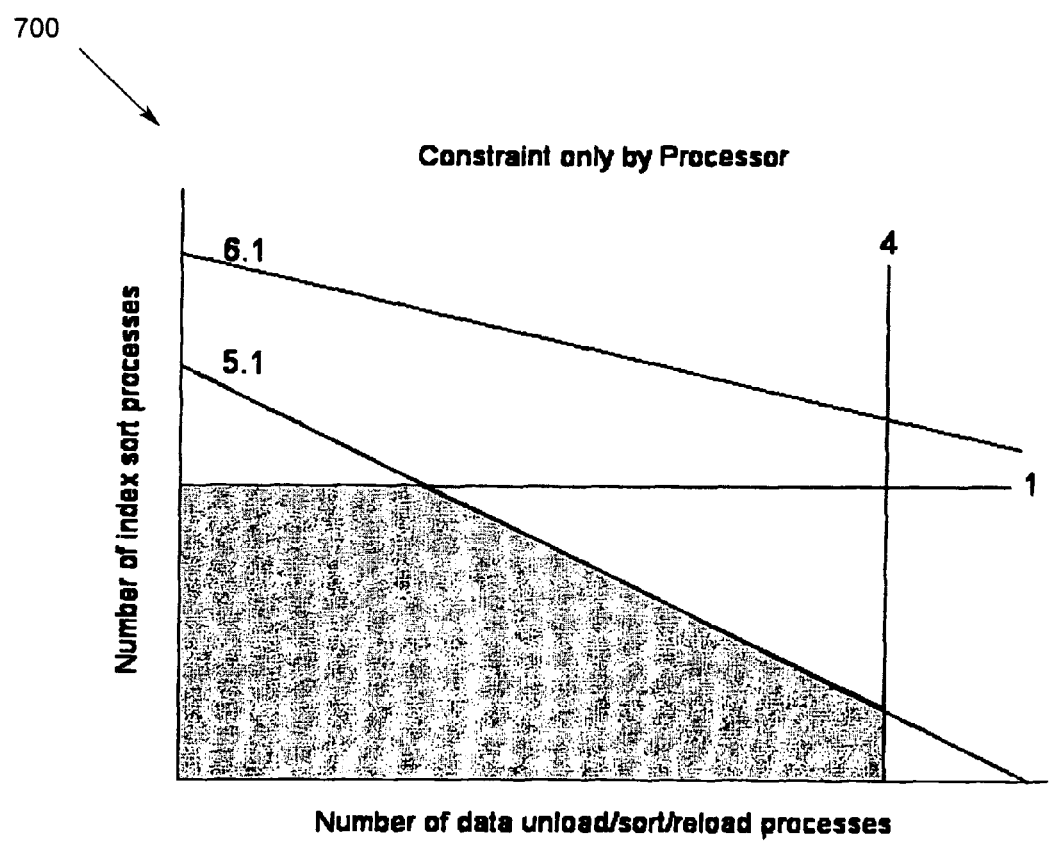
FIG. 7 is a graph that shows there is enough memory available that it does not constrain the number of processes.

In the situation where:

$$M > e + (b+c+d-2a)mP,$$

there is enough memory available that it does not constrain the number of processes. FIG. 7 is a graph that shows line 6.1 moved upward to where it no longer intersects with line 5.1 because there is enough memory available that it does not constrain the number of processes. Therefore, the graph 700 of FIG. 7 illustrates Domain 1. In this case the optimal mix of processes is achieved by attempting to equalize $N_{UR}$, $N_S$, $N_B$, $N_U$ allowing for the other constraints. This can be achieved as outlined in the four scenarios below:

| | | |
|---|---|---|
| 1. | If $N_I < mP/4$, then: | $N_S = N_B = N_I$ |
| | | $N_U = N_{NPI}$ |
| | | $N_{UR} = \min\{mP - N_S - N_B - N_U, N_P\}$ |
| 2. | If $N_P < mP/4$, then: | $N_{UR} = N_P$ |
| | | $N_U = \min\{N_{NPI}, (mP - N_{UR})/3\}$ |
| | | $N_S = N_B = \min\{N_I, (mP - N_{UR} - N_U)/2$ |
| 3. | If $N_{NPI} < m P/4$, then: | $N_U = N_{NPI}$ |
| | | $N_{UR} = \min\{N_P, (mP - N_U)/3\}$ |
| | | $N_S = N_B = \min\{N_I, (mP - N_{UR} - N_U)/2$ |
| 4. | Else then: | $N_U = N_{UR} = N_S = N_B = mP/4$ |

Domain 2

Figure 8:
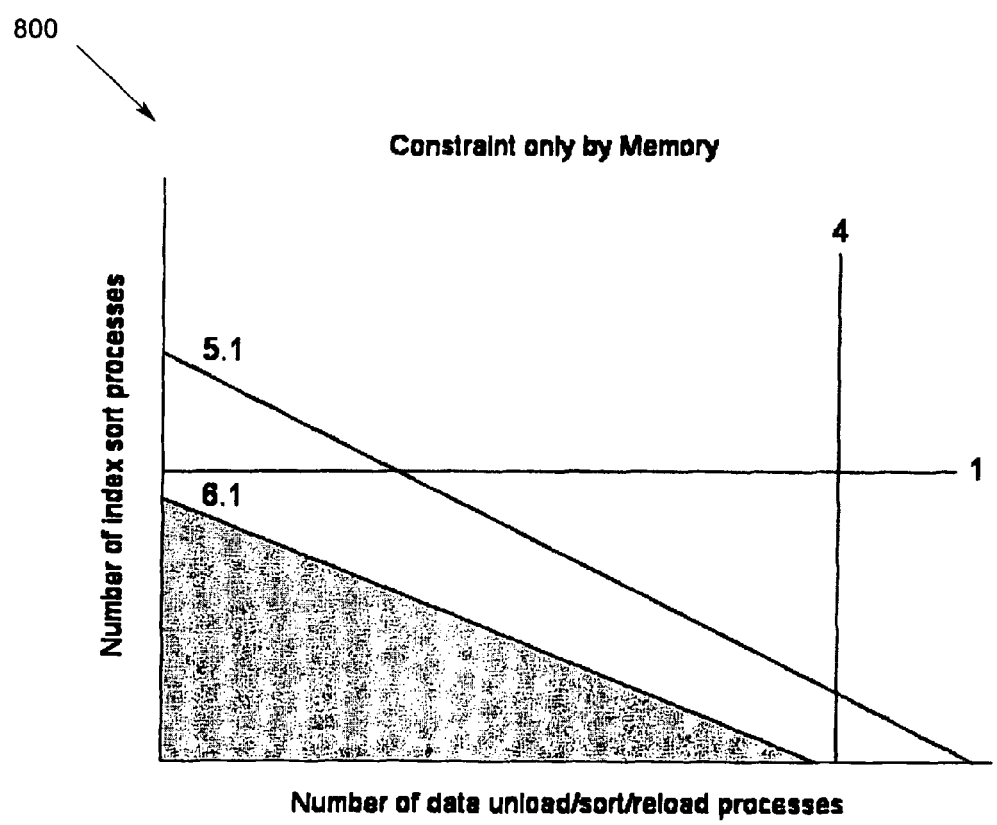
FIG. 8 is a graph that shows that there is insufficient memory available to start mP total processes.

In the situation where:

$$M < e + amP$$

there is insufficient memory available to start mP total processes. FIG. 8 is a graph that shows line 6.1 moved downward to where it no longer intersects with line 5.1 because there is insufficient memory available to start mP total processes. Therefore, the graph 800 of FIG. 8 illustrates Domain 2. In this case, let $N=(M-e)/(a+b+c+d)$. Then, the mix of processes can be determined as follows:

| | | |
|---|---|---|
| 1. | If $N_I < N$, then: | $N_S = N_B = N_I$ |
| | | $N_U = N_{NPI}$ |
| | | $N_{UR} = \min\{N_P, (M - e - bN_S - cN_B - dN_U)/a\}$ |
| 2. | If $N_P < N$, then: | $N_{UR} = N_P$ |
| | | $N_U = \min\{N_{NPI}, (M - e - aN_{UR})/(b + c + d)\}$ |
| | | $N_S = N_B = \min\{N_I, (M - e - aN_{UR} - dN_U)/(b + c)\}$ |
| 3. | If $N_{NPI} < N$, then: | $N_U = N_{NPI}$ |
| | | $N_{UR} = \min\{N_P, (M - e - dN_U)/(a + b + c)\}$ |
| | | $N_S = N_B = \min\{N_I, (M - e - dN_U - aN_{UR})/(b + c)\}$ |
| 4. | Else then: | $N_S = N_B = N_U = N_{UR} = N$ |

Domain 3

In the remaining situation where:

$$e+amP<M<e+(b+c+d-2a)mP,$$

which was illustrated originally in FIG. 6, the solution is constrained by both memory and processors and will be referred to as Domain 3. In this case:

| | | |
|---|---|---|
| 1. | If $N_1 < \dfrac{(M - e - amP)}{(b + c + d - 3a)}$, then: | $N_S = N_B = N_I$ |
| 2. | If $N_P < \dfrac{((b + c + d)mP + 3e - 3M)}{(b + c + d - 3a)}$, then: | $N_U = N_{NPI}$ $N_{UR} = \min\{N_P, (M - e - bN_S - cN_B + dN_U)/a\}$ $N_{UR} = N_P$ |
| 3. | Else then: | $N_U = \min\{N_{NPI}, mP - N_{UR}\}/3\}$ |
| | | $N_S =$ |
| | | $N_B = \min\{N_I, mP - N_{UR} - N_U\}/2\}$ |
| | | $N_S =$ |
| | | $N_B = (M - e\text{-}amP)/(b + c + d\text{-}3a)$ |
| | | $N_U = \min\{N_{NPI}, N_B\}$ |
| | | $N_{UR} = \min\{N_P, mP - N_S - N_B\text{-}N_U\}$ |

In summary, an embodiment of the present invention provides an analytical optimization scheme based on the number of different processes used in a reorganization of a database system. The method for determining an optimal number of tasks during reorganization according to an embodiment of the present invention allows for subsequent reduction to other simpler cases, which depends on the state of the objects and the actual implementation of the reorganization scheme. Thus, the optimal number and mix of processes for a generalized reorganization database system is provided instead of just an approximate or specific solution to a particular database product.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device, comprising:
program instructions executable by a processing device to perform operations for determining an optimal number of tasks during reorganization of a database system, the operations comprising:
identifying memory constraints;
identifying processing capabilities; and
determining a number of reorganization processes and a combination of reorganization processes that provides a minimum reorganization time based upon the identified memory and processing constraints, further comprising using the identified memory and processing capabilities to identify a domain representing a set of rules applicable to the identified memory and processing capabilities, and applying the set of rules of the identified domain to determine an optimal number and combination of reorganization processes that minimizes a reorganization time.

2. The program storage device of claim 1, wherein the determining a number of reorganization processes and a combination of reorganization processes further comprises constraining a number of partitions being reorganized to not exceed a number of indices to be built.

3. The program storage device of claim 1, wherein the identifying processing capabilities further comprising determining a number of build processes based on a number of sort processes.

4. The program storage device of claim 1 wherein the determining a number of reorganization processes and a combination of reorganization processes further comprises selecting combination of sort processes and unload/sort/reload processes that maximizes a number of sort processes and does not exceed a maximum total number of memory constraints.

5. The program storage device of claim 1, the determining a number of reorganization processes and a combination of reorganization processes further comprises maintaining a number of build processes equal to a number of sort processes.

6. The program storage device of claim 1, the determining a number of reorganization processes and a combination of reorganization processes further comprises preventing a number of NPI unload processes from exceeding a number of NPIs to be built or a number of build processes.

7. The program storage device of claim 1, the determining a number of reorganization processes and a combination of reorganization processes further comprises preventing a number of data unload/reload processes from exceeding a number of partitions to be reorganized.

8. The program storage device of claim 1, the determining a number of reorganization processes and a combination of reorganization processes further comprises preventing a total of all processes from exceeding a capacity of processors being used to perform the reorganization.

9. The program storage device of claim 1, the determining a number of reorganization processes and a combination of reorganization processes further comprises preventing an amount of memory used by all reorganization processes from exceeding a total memory capacity.

10. The program storage device of claim 1, wherein the identified memory and processing capabilities indicate that a number of processes will not exceed a total memory capacity.

11. The program storage device of claim 10, wherein the set of rules applicable when the number of processes will not exceed the total memory capacity and when a number of indices is less than one-fourth of a processor capacity comprises setting a number of index sort processes equal to a number of index build processes, which is equal to a number of indices, setting a number of NPI unload processes equal to a number of NPIs and setting a number of data unload/reload processes equal to the lesser of a processor capacity less a number of index sort processes, a number of index build processes and a number of NPI unload processes or a number of partitions being reorganized.

12. The program storage device of claim 10, wherein the set of rules applicable when the number of processes will not exceed the total memory capacity and when a number of partitions being reorganized is less than one-fourth of a processor capacity comprises setting a number of data unload/reload processes equal to a number of partitions being reorganized; setting a number of NPI unload processes equal to the lesser of a number of NPIs or a processor capacity less a number of data unload/reload processes divided by three and setting a number of index sort processes equal to a number of index build processes, which is equal to the lesser of a number of indices or a processor capacity less a number of data unload/reload processes and a number of NPI unload processes divided by two.

13. The program storage device of claim 10, wherein the set of rules applicable when the number of processes will not exceed the total memory capacity and when a number of NPIs is less than one-fourth of a processor capacity comprises setting a number of NPI unload processes equal to a number of NPIs, setting a number of data unload/reload processes equal to the lesser of a number of partitions being reorganized or a processor capacity less a number of NPI unload processes divided by three and setting a number of index sort processes equal to a number of index build processes, which is equal to the lesser of a number of indices or a processor capacity less a number of data unload/reload processes and a number of NPI unload processes divided by two.

14. The program storage device of claim 10, wherein the set of rules applicable when the number of processes will not exceed the total memory capacity, when a number of indices is not less than one-fourth of a processor capacity, when a number of partitions being reorganized is not less than one-fourth of the processor capacity, and when a number of NPIs is not less than one-fourth of the processor capacity comprises setting a number of NPI unload processes equal to a number of data unload/reload processes, which is equal to a number of index sort processes, which is equal to a number of index build processes, which is equal to a processor capacity divided by four.

15. The program storage device of claim 1, wherein the identified memory and processing capabilities indicate that the available memory constrains the number of processes.

16. The program storage device of claim 15, wherein the set of rules applicable when the available memory constrains the number of processes and when a number of indices is less than a total amount of available memory less an amount of memory required for directing the reorganization processes divided by a total amount of memory required for each reorganization process comprises setting a number of index sort processes equal to a number of index build processes and a number of indices, setting a number of NPI unload processes equal to a number of NPIs; and setting a number of data unload/reload processes equal to the lesser or a number of partitions being reorganized or a total amount of available memory less an amount of memory required for directing the reorganization and performing index sort processes, index build processes and NPI unload processes divided by an amount of memory required for each data unload/reload process.

17. The program storage device of claim 15, wherein the set of rules applicable when the available memory constrains the number of processes and when a number of partitions being reorganized is less than a total amount of available memory less an amount of memory required for directing the reorganization processes divided by a total amount of memory required for each reorganization process comprises setting a number of data unload/reload processes equal to a number of partitions being reorganized, setting a number of NPI unload processes equal to the lesser of a number of NPIs or a total amount of available memory less an amount of memory required for directing the reorganization and performing unload/reload processes divided by an amount of memory required for index sort processes, index build processes and NPI unload processes and setting a number of index sort processes equal to a number of index build processes and the lesser of a number of indices or a total amount of available memory less an amount of memory required for directing the reorganization process, performing data unload/reload processes and NPI unload processes divided by an amount of memory required for performing index sort processes and index build processes.

18. The program storage device of claim 15, wherein the set of rules applicable when the available memory constrains the number of processes and when a number of NPIs is less than a total amount of available memory less an amount of memory required for directing the reorganization processes divided by a total amount of memory required for each reorganization process comprises setting a number of NPI unload processes equal to a number of NPIs, setting a number of data unload/reload processes equal to the lesser of a number of partitions being reorganized or a total amount of available memory less an amount of memory required for directing the reorganization process and performing NPI unload processes divided by an amount of memory required for performing unload/reload processes, index sort processes and index build processes and setting a number of index sort processes equal to a number of index build processes and the lesser of a number of indices or a total amount of available memory less an amount of memory required for directing the reorganization process and performing data unload/reload processes and NPI unload processes divided by an amount of memory required for performing index sort processes and index build processes.

19. The program storage device of claim 15, wherein the set of rules applicable when the available memory constrains the number of processes, when a number of indices is not less than a total amount of available memory less an amount of memory required for directing the reorganization processes divided by a total amount of memory required for each reorganization process, when a number of partitions being reorganized is not less than a total amount of available memory less an amount of memory required for directing the reorganization processes divided by a total amount of memory required for each reorganization process and when a number of NPIs is not less than a total amount of available memory less an amount of memory required for directing the reorganization processes divided by a total amount of memory required tor each reorganization process comprises setting a number of index sort processes equal to a number of index build processes and a number of NPI unload processes, which is equal to a number of data unload/reload processes, which is equal to a total amount of available memory less an amount of memory required for directing the reorganization processes divided by a total amount of memory required for each reorganization process.

20. The program storage device of claim 1, wherein the identified memory and processing capabilities indicate memory and processing capabilities are a constraint.

21. The program storage device of claim 20, wherein the set of rules applicable when memory and processing capabilities are a constraint and when a number of indices is less than a total amount of available memory less an amount of memory required for directing the reorganization processes and an amount of memory required for each load process multiplied by the processing capabilities divided by a total amount of memory required for index sort processes, index build processes, NPI unload process and three times an amount of memory for data unload/reload processes, comprises setting a number of index sort processes equal to a number of index build processes, which is equal to a number of indices, setting a number of NPI unload processes equal to a number of NPIs and setting a number of data unload/reload processes equal to the lesser of a number of partitions being reorganized or a total amount of available memory less an amount of memory required for directing the reorganization process and performing index sort processes and NPI unload processes divided by an amount of memory required for performing unload/reload processes.

22. The program storage device of claim 20, wherein the set of rules applicable when memory and processing capabilities are a constraint and when a number of partitions being reorganized is less than a sum an amount of memory required for index sort processes, index build processes and NPI unload processes multiplied by the processing capabilities and three times an amount of memory required for directing the reorganization process less three times a total amount of available memory divided by a total amount of memory required for index sort processes, index build processes, NPI unload process less three times an amount of memory for data unload/reload processes, comprises setting a number of data unload/reload processes equal to a number of partitions being reorganized, setting a number of NPI unload processes equal to the lesser of a number of NPIs or the processor capacity less a number of data unload/reload processes divided by three and setting a number of index sort processes equal to a number of index build processes, which is equal to the lesser of a number of indices or a processor capacity less a number of data unload/reload processes and a number of NPI unload processes divided by two.

23. The program storage device of claim 20, wherein the set of rules applicable when memory and processing capabilities are a constraint, when a number of indices is not less than a total amount of available memory less an amount of memory required for directing the reorganization processes and an amount of memory required for each unload/reload process multiplied by the processing capabilities divided by a total amount of memory required for index sort processes, index build processes, NPI unload process and three times an amount of memory for data unload/reload processes, and when a number of partitions being reorganized is not less than a sum an amount of memory required for index sort processes, index build processes and NPI unload processes multiplied by the processing capabilities and three times an amount of memory required for directing the reorganization process less three times the total amount of available memory divided by a total amount of memory required for index sort processes, index build processes, NPI unload process less three times an amount of memory for data unload/reload processes, comprises setting a number of index sort processes equal to a number of index build processes, which is equal to a total amount of available memory less an amount of memory required for directing the reorganization processes and an amount of memory required for each unload/reload process multiplied by the processing capabilities divided by divided by a total amount of memory required for index sort processes, index build processes, NPI unload process and three times an amount of memory for data unload/reload processes, setting a number of NPI unload processes equal to the lesser of a number of NPIs or a number of index build processes and setting a number of data unload/reload processes equal to the lesser of a number of partitions being reorganized or a processor capacity less a number of index sort processes, a number of index build processes and a number of NPI unload processes.

24. An apparatus for reorganizing a database, comprising:
a computer having a data store coupled thereto, wherein the data store stores data; and
one or more computer programs, performed by the computer, for identifying memory constraints, identifying processing capabilities, and determining a number of reorganization processes and a combination of reorganization processes that provides a minimum reorganization time based upon the identified memory and processing constraints, by using the identified memory and processing capabilities to identify a domain representing a set of rules applicable to the identified memory and processing capabilities, and applying the set of rules of the identified domain to determine an optimal number and combination of reorganization processes that minimizes a reorganization time.

25. An apparatus for reorganizing a database, comprising:
means for storing data in a database; and
means, coupled to the means for storing, for reorganizing the database, further comprising means for identifying memory constraints, for identifying processing capabilities, and for determining a number of reorganization processes and a combination of reorganization processes that provides a minimum reorganization time based upon the identified memory and processing constraints, by using the identified memory and processing capabilities to identify a domain representing a set of rules applicable to the identified memory and processing capabilities, and applying the set of rules of the identified domain to determine an optimal number and combination of reorganization processes that minimizes a reorganization time.

26. A method of determining an optimal number of tasks during reorganization of a database system, comprising:
identifying memory constraints;
identifying processing capabilities; and
determining a number of reorganization processes and a combination of reorganization processes that provides a minimum reorganization time based upon the identified memory and processing constraints, further comprising using the identified memory and processing capabilities to identify a domain representing a set of rules applicable to the identified memory and processing capabilities, and applying the set of rules of the identified domain to determine an optimal number and combination of reorganization processes that minimizes a reorganization time.

* * * * *